July 24, 1923.

E. LUX 1,462,712

CLAMPING BOLT FOR TIRE MOLDS

Filed Aug. 9, 1921

INVENTOR.
EDWARD LUX
BY A. B. Bowman
ATTORNEY.

Patented July 24, 1923.

1,462,712

UNITED STATES PATENT OFFICE.

EDWARD LUX, OF SAN DIEGO, CALIFORNIA.

CLAMPING BOLT FOR TIRE MOLDS.

Application filed August 9, 1921. Serial No. 490,902.

*To all whom it may concern:*

Be it known that I, EDWARD LUX, a citizen of the United States, residing at San Diego, in the county of San Diego and State of California, have invented a certain new and useful Clamping Bolt for Tire Molds, of which the following is a specification.

My invention relates to tire mold clamp bolts used for clamping the two mold members together for molding tires and used during vulcanization of the tires and inflation of the air bag and the like and the objects of my invention are: first, to provide novel means of clamping the two molds together, second, to provide a clamping bolt for tire molds which will facilitate the clamping and releasing of the tire mold; third, to provide a device of this class which is very efficient in its action; fourth, to provide a clamping bolt of this class which is applicable for use in connection with the tire molds now in use and fifth, to provide a clamping bolt for tire molds which is very simple and economical of construction, durable, easy to operate, efficient in its action and which will not readily deteriorate or get out of order.

Figure 1:
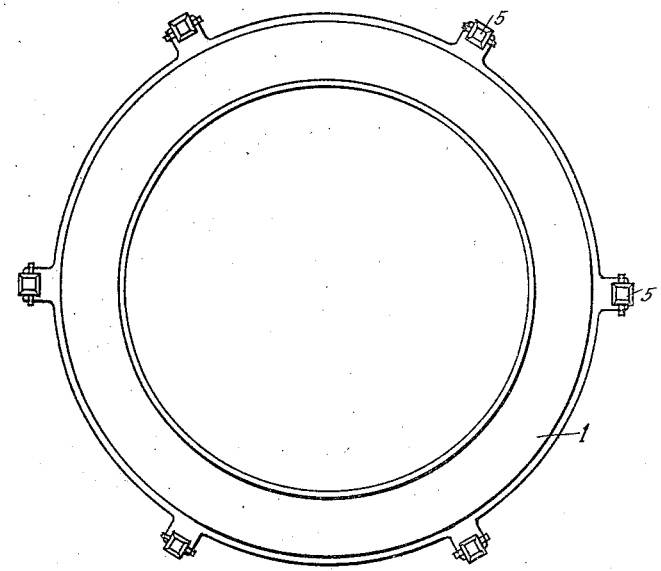
Figure 2:
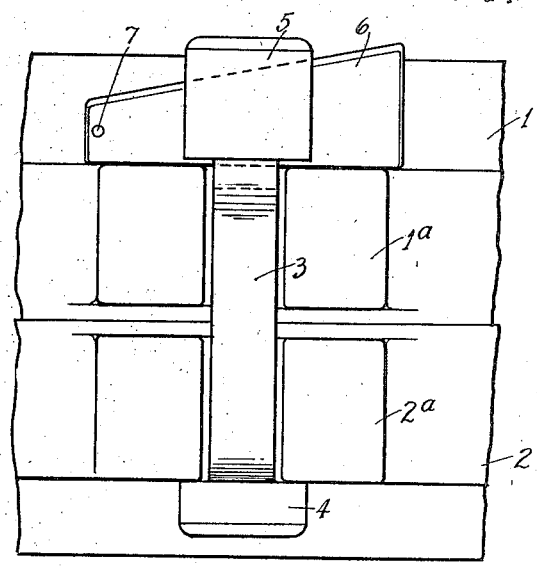
Figure 3:
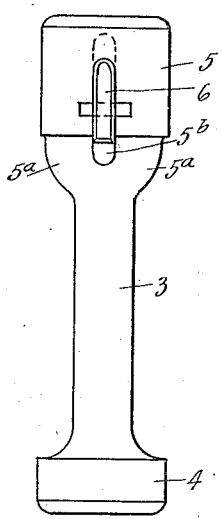
Figure 4:
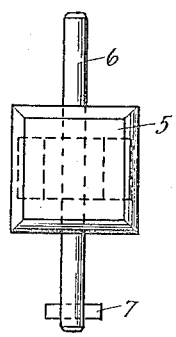

With these and other objects in view as will appear hereinafter my invention consists of certain novel features of construction, combination and arrangement of parts and portions as will be hereinafter described in detail and particularly set forth in the appended claim reference being had to the accompanying drawings and to the characters of reference thereon which form a part of this application in which:

Figure 1 is a side elevational view of the tire mold showing my clamping bolts in position thereon ready for use; Fig. 2 is a fragmentary edge view of the two molds positioned in their clamped position showing my clamp bolt and mold in operative position thereon on an enlarged scale; Fig. 3 is a side elevational view of the bolt itself at a right angle from that of Fig. 2 and Fig. 4 is an end view of said bolt.

Similar characters of reference refer to similar parts and portions throughout the several views of the drawings.

The tire molds 1 and 2, bolt member 3, head 4, head 5, wedge member 6 and pin 7 constitute the principal parts and portions of my mold clamping device.

The mold members 1 and 2 are of the conventional type and each is provided with a plurality of bifurcated lugs $1^a$ and $2^a$ thereon. In this case I have shown 6 equally spaced bifurcated lugs for supporting the two mold members in their clamped relation to each other. In the space between the extended portions of the bifurcated lugs $1^a$ and $2^a$ is mounted a bolt 3 which is adapted to fit loosely therein. This bolt 3 is provided with a head 4 on one end which is adapted to engage the outer edges of the lugs $2^a$ and the opposite end is also provided with a head 5, which is adapted to engage the outer edges of the lugs $1^a$ and said bolts hold the two mold members loosely together until they are clamped. This head 5 however, is slightly larger and is provided with an enlarged reinforced portion $5^a$ on opposite sides as shown best in Fig 3 of the drawings and with a slot therein extending therethrough at a right angle to the lug portions $5^a$, the upper side of this slot is beveled and reciprocably mounted in this slot $5^b$ is a wedge 6, the upper side of which is tapered conforming to the beveled upper surface of the slots $5^b$ and is adapted to practically fill said slot when the wedge 6 is positioned so that the large end is clear in said slot so that the wedge 6 will not pass through said slot and the lower end of said wedge member 6 is provided with a pin 7 positioned at a right angle to said wedge member and extending therethrough which is adapted to prevent the wedge member from dropping from said slot from the other direction.

Though I have shown and described a particular construction, combination and arrangement of parts and portions, I do not wish to be limited to this particular construction, combination and arrangement but desire to include in the scope of my invention the construction, combination and arrangement substantially as set forth in the appended claim.

It is obvious that with this construction there is provided a means for clamping the two members together in which a wedge or inclined member is used for engaging the outer surface of the bifurcated lugs on one of the mold sections for clamping the mold members together; that a soft hammer or mallet may be used for driving the wedge member in and out for tightening and loosening the bolt and clamping the mold members and releasing the same; that the heads 4 and 5 may be made of sufficient strength so that they are very durable and little wear will take place; that the wedge member for clamping and releasing the bolt member provides a quick, efficient and simple means of clamping and releasing said bolt members.

Having thus described my invention what I claim as new and desire to secure by Letters Patent is:

A device of the class described, including a bolt with a large abruptly extending head on each end, the head on one end provided with a tapered slot therein and a conforming wedge reciprocably mounted in said slot.

In testimony whereof I have hereunto set my hand at San Diego, California, this 2nd day of August, 1921.

EDWARD LUX.